(12) United States Patent
Huang et al.

(10) Patent No.: US 12,333,157 B2
(45) Date of Patent: Jun. 17, 2025

(54) METHOD FOR PROTECTING PARTIAL SPACE OF SSD SPACE AND STORAGE SYSTEM

(71) Applicant: INNOGRIT TECHNOLOGIES CO., LTD., Shanghai (CN)

(72) Inventors: Yang Huang, Shanghai (CN); Zhetian Zhu, Shanghai (CN); Qian Cheng, Shanghai (CN); Zhengtian Feng, Shanghai (CN); Longtao Gao, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 48 days.

(21) Appl. No.: 18/484,129

(22) Filed: Oct. 10, 2023

(65) Prior Publication Data

US 2024/0118816 A1 Apr. 11, 2024

(30) Foreign Application Priority Data

Oct. 10, 2022 (CN) .......................... 202211236522.2

(51) Int. Cl.
*G06F 3/06* (2006.01)
(52) U.S. Cl.
CPC .......... *G06F 3/0623* (2013.01); *G06F 3/0644* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2003/0131112 A1* | 7/2003 | Yu | .......................... | G06F 21/567 709/229 |
| 2003/0225960 A1* | 12/2003 | Guu | .......................... | G06F 21/80 711/164 |
| 2004/0088513 A1* | 5/2004 | Biessener | ............... | G06F 21/85 711/173 |
| 2021/0208808 A1* | 7/2021 | Gupta | ................... | G06F 3/0673 |

* cited by examiner

*Primary Examiner* — Khoa D Doan
(74) *Attorney, Agent, or Firm* — HSML P. C.

(57) ABSTRACT

This application relates to the field of storage technology and discloses a method for protecting partial space of SSD and a storage system. The storage space of the SSD is divided into multiple regions and there is a partition table stored in the SSD, which includes region type of each region. The method includes: receiving, by the SSD, a command to read the partition table; and retrieving, by the SSD, the partition table, removing one or more regions with the region type being locked from the partition table, and returning the removed partition table. This application provides a simple implementation and self-encrypting protection scheme, which requires fewer running resources, is easy to operate, has strong portability, and can meet basic self-encrypting and locking requirements.

10 Claims, 2 Drawing Sheets

METHOD FOR PROTECTING PARTIAL SPACE OF SSD SPACE AND STORAGE SYSTEM

CROSS-REFERENCE TO PRIOR APPLICATION

This application claims priority to Chinese Application number CN202211236522.2 which is filed on Oct. 10, 2022, the contents of which are incorporated herein by reference.

TECHNICAL FIELD

This application relates to the field of solid-state driver (SSD) technology, in particular to a method for protecting partial space of SSD and a storage system.

BACKGROUND

Currently, there are many common protocol applications in the field of SSD encryption security, including the Opal protocol under the TCG specification, it is a security standard specification developed by TCG and defines security policies for static data protection, including device self-encrypting drive (SED) based on AES-128 or AES-256, user permission management, and pre boot authentication. Due to the use of hardware self-encrypting technology, the Opal does not have an impact on system performance. At the same time, it is independent of the operating system and cannot be affected by using different operating systems and exploiting different operating system vulnerabilities. It is a refinement of traditional self-encrypting technology and one of the important standards in the storage industry.

The Opal can set up multiple users with different categories and permissions, and divide the device into multiple locked ranges; each locked range, user configuration, and access permission are independent of each other, making it flexible to use; even if the device leaves the owner, it can prevent unauthorized access, protect users' static data, and effectively reduce the risk of data leakage; it supports MEK deletion, which can quickly and safely clear user data. In addition, the Opal also has expansible feature, which can be achieved by adding new function to support more user requests.

The Opal has a variety of functions and is flexible to use, but at the same time, its implementation is relatively complex, resulting in high development and maintenance costs. In actual terminal customer usage scenarios, only a small portion of them may be used, and most functions are not or rarely used, resulting in unnecessary waste of device resources.

SUMMARY OF THE INVENTION

The purpose of this application is to provide a method for protecting partial space of SSD, which requires fewer running resources, is simple to operate, has strong portability, and can meet basic self-encrypting and locking requirements.

This application discloses a method for protecting partial space of SSD, storage space of the SSD is divided into multiple regions and there is a partition table stored in the SSD, which includes region type of each region, the method comprises:
  receiving, by the SSD, a command to read the partition table; and
  retrieving, by the SSD, the partition table, removing one or more regions with the region type being locked from the partition table, and returning the removed partition table.

In an embodiment, the partition table includes partition planning information for each region, and the partition planning information includes region type and start and end addresses, removing one or more regions with the region type being locked from the partition table includes: setting the partition planning information corresponding to the one or more regions with the region type being locked to a default value.

In an embodiment, if the region type of the one or more regions is unlocked or not-locked, the partition table is directly returned.

In an embodiment, the not-locked type represents the region is readable, writable, and erasable, and the unlocked type represents the region is readable, writable, and unerasable.

In an embodiment, the locked type represents the region is unreadable, unwritable, and unerasable.

The present application also discloses an SSD storage system, wherein storage space of the SSD is divided into multiple regions and there is a partition table stored in the SSD, which includes region type of each region; when the SSD receives a command to read the partition table, it retrieves the partition table, removes one or more regions with the region type being locked from the partition table, and returns the removed partition table.

In an embodiment, the partition table includes partition planning information for each region, which includes region type and start and end addresses, removing the one or more regions with the region type being locked from the partition table includes: setting the partition planning information corresponding to the one or more regions with the region type being locked to a default value.

In an embodiment, if the region type of the one or more regions is unlocked or not-locked, the partition table is directly returned.

In an embodiment, the SSD storage system has at least four statuses:
  status 0: the storage space of the SSD is not divided into multiple regions;
  status 1: the storage space of the SSD is divided into multiple regions, with each region not-locked;
  status 2: the storage space of the SSD is divided into multiple regions, with at least one region locked but has been unlocked; and
  status 3: the storage space of the SSD is divided into multiple regions, with at least one region locked.

In an embodiment, the not-locked type represents the region is readable, writable, and erasable, the unlocked type represents the region is readable, writable, and unerasable, and the locked type represents the region is unreadable, unwritable, and unerasable.

Compared to the Opal, the implementation method of this application requires fewer running resources, is simple to operate, has strong portability, and can meet basic self-encrypting and locking requirements. At the same time, according to customer requirements, functions can be tailored, for example, in cases where security requirements are not high, only user access management function is needed, and then self-encrypting function can be removed to further reduce running resource costs.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute Various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, many technical details have been proposed to help readers better understand this application. However, those skilled in the art can understand that even without these technical details and various changes and modifications based on the following implementation methods, the technical solution required for protection in this application can still be achieved.

In order to make the purpose, technical solution, and advantages of this application clearer, the implementation method of this application will be further described in detail in conjunction with the accompanying drawings.

This application discloses a method for protecting partial space of the SSD, wherein the storage space of the SSD may be divided into multiple regions, there is a partition table stored in the SSD, and the partition table includes the region type for each region. Specifically, in one embodiment, the partition table may include partition planning information for each region, wherein the partition planning information includes region type and start and end addresses. In one embodiment, the region type may be not-locked, locked, unlocked, and so on. Wherein, the locked type represents that the region is unreadable, unwritable, and unerasable, the not-locked type represents that the region is readable, writable, and erasable, and the unlocked type represents that the region is readable, writable, and unerasable.

Figure 1:
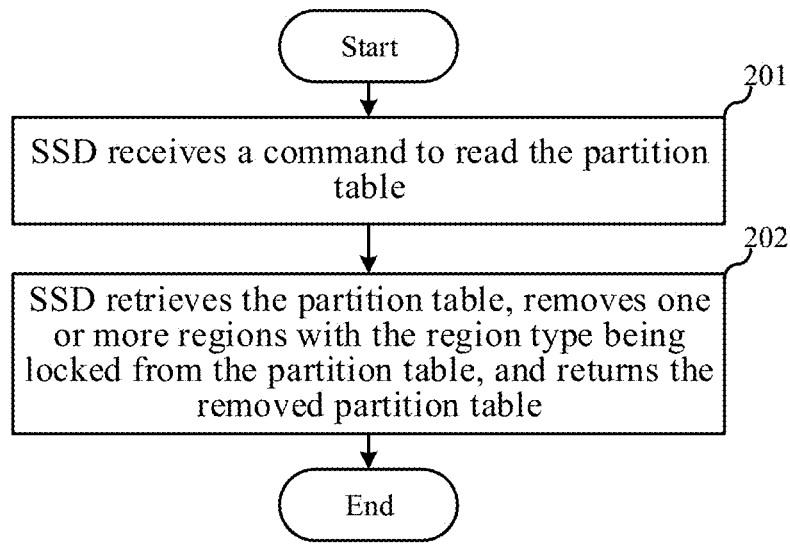
FIG. 1 is a schematic flowchart of a method for protecting partial space of SSD according to an embodiment of this application.

FIG. 1 shows a flowchart of a method for protecting partial space of the SSD in an embodiment, which includes the following steps:

Step 101, the SSD receives a command to read the partition table.

Step 102, the SSD retrieves the partition table, removes one or more regions with the region type being locked from the partition table, and returns the removed partition table.

In one embodiment, removing one or more regions with the region type being locked from the partition table includes: setting the partition planning information corresponding to the one or more regions with the region type being locked to a default value. For example, the partition planning information corresponding to the one or more regions with the region type being locked is set as zero.

In addition, in one embodiment, if the region type of the one or more regions is unlocked or not-locked, that is, if no region is locked, the partition table is directly returned.

In order to better understand the technical solution of this application, the following is a specific example to illustrate. The details listed in this example are mainly for ease of understanding and are not intended to limit the scope of protection of this application.

This application designs a simple implementation and self-encrypting protection scheme, with the main functions of:

1. It has a dynamically adjustable locked range that only specific permissions have access to, and the data within the range is protected by device self-encrypting;
2. User access permissions are divided into three levels: ordinary user(s) can only access unlocked range spaces; ordinary encrypted user(s) can access all range spaces; administrator user(s) can not only access all spaces, but also manage the keys of the ordinary encrypted user(s), adjust the locked range, and have the function of erasing all data;
3. The locked partitions can be automatically hided and displayed when switching between locked state and unlocked state;
4. There is an administrator information storage space for storing important user information, such as when the password is forgotten, it can be retrieved through the administrator.

The host of this application provides the following commands for the SSD:

1. Set password
   Used to set the password for both the ordinary user(s) and the administrator user(s), to enter security information for password retrieval, and enable the locking function.
2. Unlock
   Used to unlock the locked logical block address (LBA) range.
3. Set lock range
   Used to set the LBA range that needs to be locked.
4. Disable password
   Delete the password of current ordinary user and disable the locking function.
5. Enable/disable LBA0 read only
   Set LBA0 to read-only state or release it from read-only state. Its purpose is to prevent users without access permissions from modifying the partition information of the disk.

According to the execution of different commands, the SSD can exhibit the following different statuses. The following example assumes that the disk partition of the SSD has been set, for example, LBA0~LBAn on the disk is set as partition A, LBAn+1~LBAm on the disk is set as partition B, and the LBA range that needs to be locked is set to disk partition B through the Set lock range.

Status 0: the disk has no partitions, and is in factory initial state

Figure 2:
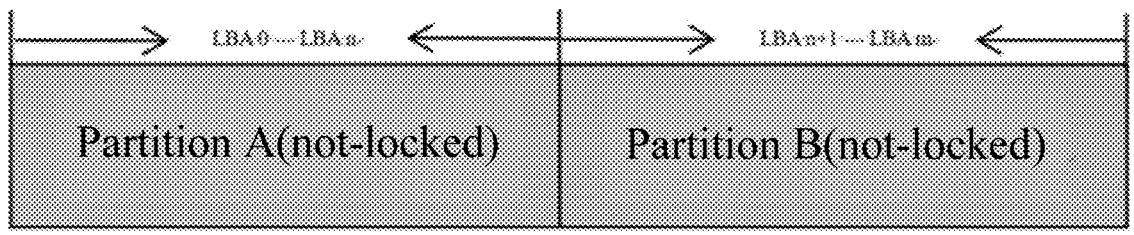
FIG. 2 is a schematic diagram of storage space of the SSD being status 1 according to an embodiment of this application.

Status 1: the state when the locking function is disenabled, as shown in FIG. 2

Figure 3:
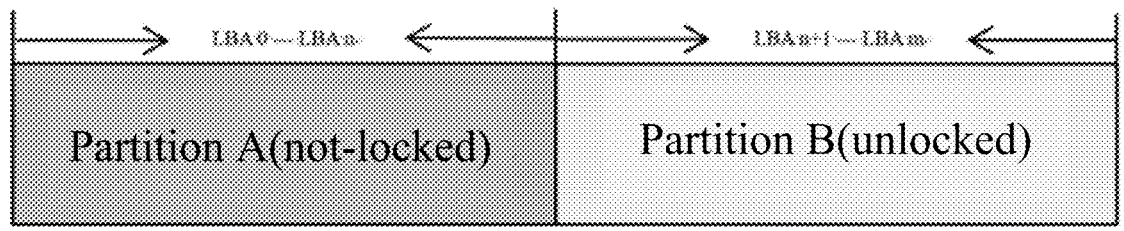
FIG. 3 is a schematic diagram of storage space of the SSD being status 2 according to an embodiment of this application.

Status 2: the locking function is enabled, but the locked partition is in unlocked state, as shown in FIG. 3

Figure 4:
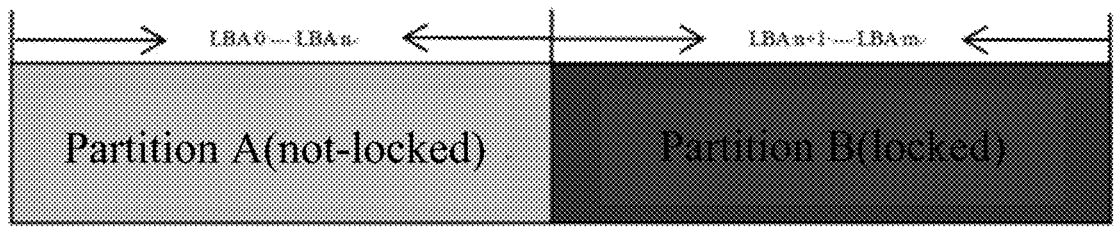
FIG. 4 is a schematic diagram of storage space of the SSD being status 3 according to an embodiment of this application.

Status 3: the locking function is enabled, and the locked partition is in locked state. In this status, the disk partition B is not visible to the host, only the disk partition A can be seen, as shown in FIG. 4. In order to allow the host to see unlocked partition, the partition table information is dynamically modified when the host queries partition information, so that the host can only see not-locked and unlocked partitions.

Status 4: LBA0 is read only.

Figure 5:
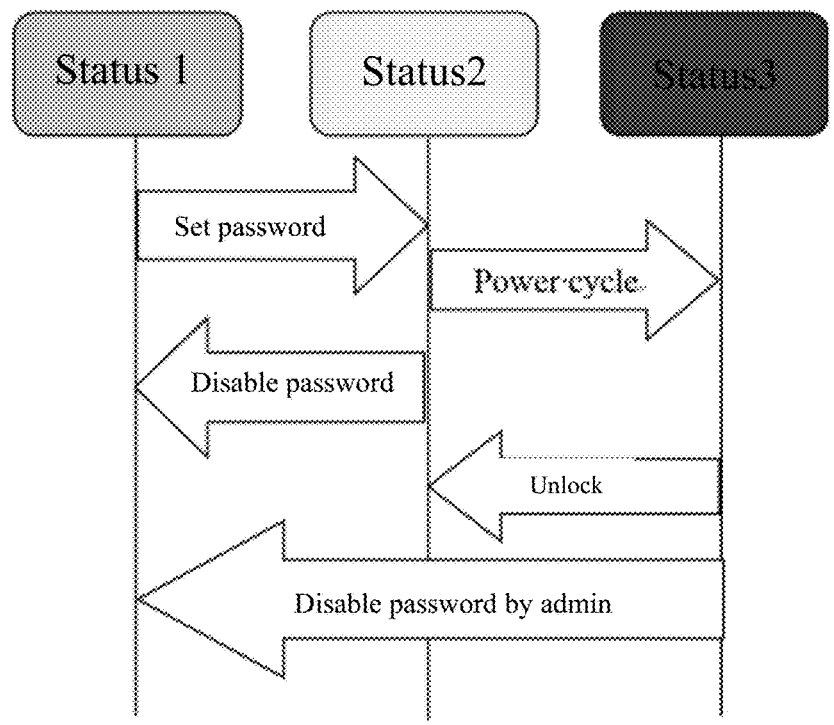
FIG. 5 is a schematic diagram of the SSD transforming among different statuses according to an embodiment of this application.

The responses to host commands in various statuses are shown in Table 1. Moreover, the host uses a state machine to transform the SSD among the statuses described above, as shown in FIG. 5.

TABLE 1

SSD responses to the host commands in various statuses

| | Status 0 | Status 1 | | Status 2 | | Status 3 | |
|---|---|---|---|---|---|---|---|
| | No partition | Partition A | Partition B | Partition A | Partition B | Partition A | Partition B |
| Host read | allowed | allowed | | allowed | | allowed | refused |
| Host write | | | | | | | refused |
| Host format | | | | | refused | | refused |
| Host format + Status 4 | | | | refused | | | |

This application can automatically hide and display locked partitions when switching between locked and unlocked states. Taking the MBR format partition as an example, Table 2 shows the MBR standard structure information:

TABLE 2

MBR standard structure information

| Address (hexadecimal) | describe | Length (Bytes) |
|---|---|---|
| 0000 | Code area | 440 |
| 01B8 | Select Disk Flag | 4 |
| 01BC | Normally empty value: 0x0000 | 2 |
| 01BE | Partition table planning (four 16-byte primary partition entry addresses): Primary partition 1: 16-byte (including the type and start and end addresses of the partition) Primary partition 2: 16-byte Primary partition 3: 16-byte Primary partition 4: 16-byte | 64 |
| 01FE | MBR valid flag: 0x55 | 1 |
| 01FF | MBR valid flag: 0xAA | 1 |

After the SSD device determines the locked partition by storing the locking information on the NAND flash memory, it sets the 16-byte content of the corresponding primary partition in the partition table planning column to 0, and then sends the modified partition table back to the host. In this way, the host will only see not-locked partitions. Wherein, there is locking information on the NAND flash memory, which was actively saved during the last power on stage when the host executed commands such as setting or deleting passwords, this information will not be lost due to power failure.

Figure 6:
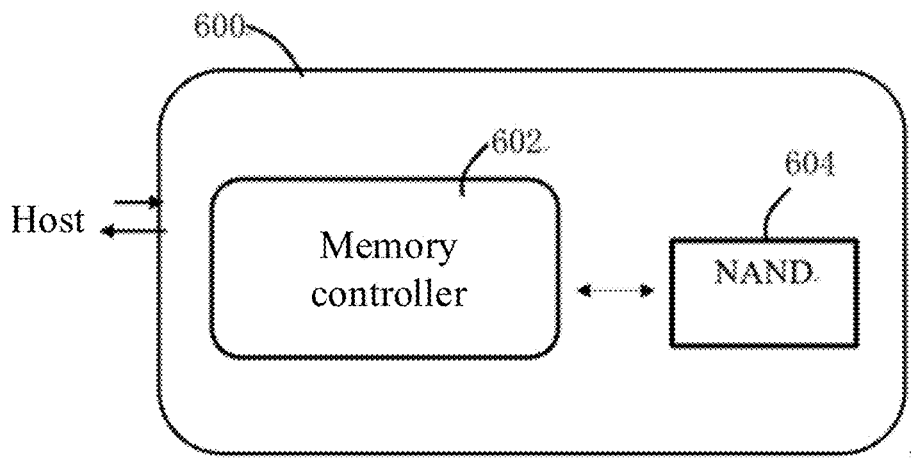
FIG. 6 is a block diagram of an SSD storage system according to an embodiment of this application.

Another aspect of the present application also relates to an SSD storage system, and FIG. 6 shows a storage system 600 according to an embodiment of the present disclosure. The storage system 600 may include a storage particle 604 and a memory controller 602 coupled to the storage particle 604. When the memory controller 602 is coupled to the host, it can provide data storage and/or access to stored data for the host. According to this embodiment, the memory controller 502 receives a control signal and performs operations corresponding to the control signal. The storage particle 604 sends the execution result of the operation corresponding to the control signal to the memory controller 602. The storage particle 604 can be a storage device based on non-volatile memory (NVM), such as NAND flash memory, NOR flash memory, Magnetoresistive random access memory (MRAM), resistive random access memory (RRAM), phase change random access memory (PCRAM), Nano RAM, and so on. NAND flash memory can be used as an example. It should be noted that storage system 600 can include multiple storage particles, and storage particles 604 can be represented as multiple storage particles.

The storage space of the SSD may be divided into multiple regions, there is a partition table stored in the SSD, and the partition table includes the region type for each region. When the SSD receives a command to read the partition table, it retrieves the partition table and removes one or more regions with the region type being locked from the partition table, for example, setting the partition planning information corresponding to the region type being locked to a default value. Then, the removed partition table is returned. If the region type of the one or more regions is unlocked or not-locked, the partition table is directly returned.

In one embodiment, the SSD storage system has at least four statuses:

status 0: the storage space of the SSD is not divided into multiple regions;

status 1: the storage space of the SSD is divided into multiple regions, with each region not-locked;

status 2: the storage space of the SSD is divided into multiple regions, with at least one region locked but has been unlocked;

status 3: the storage space of the SSD is divided into multiple regions, with at least one region locked.

In one embodiment, the not-locked type represents the region is readable, writable, and erasable, the unlocked type represents the region is readable, writable, and unerasable, and the locked type represents the region is unreadable, unwritable, and unerasable.

It should be noted that in the application documents of this patent, relational terms such as first and second are only used to distinguish one entity or operation from another entity or operation, and do not necessarily require or imply any actual relationship or order between these entities or operations. Moreover, the terms "comprises" or "comprising" or "includes" or any other variations thereof is intended to encompass a non-exclusive inclusion, such that a process, method, item, or device that includes a series of elements not only includes those elements, but also other elements that are not explicitly listed, or also include elements inherent in such a process, method, item, or device. Without further limitations, the element limited by the statement 'including a/an' does not exclude the existence of another identical element in the process, method, item, or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All literature mentioned in this specification is considered to be included as a whole in the public content of this application, so as to serve as a basis for modification if necessary. Furthermore, it should be understood that the above is only a preferred embodiment of this specification and is not intended to limit the scope of protection of this specification. Any modifications, equivalent replacements, improvements, etc. made within the spirit and principles of one or more embodiments of this specification shall be included within the scope of protection of one or more embodiments of this specification.

In some cases, the actions or steps recorded in the claims may be executed in a different order than in the embodiments and still achieve the desired results. In addition, the process depicted in the attached drawings does not necessarily require a specific or continuous sequence to achieve the desired results. In some implementations, multitasking and parallel processing are also possible or may be advantageous.

What is claimed is:

1. A method for protecting partial space of SSD, wherein storage space of the SSD is divided into multiple regions and there is a partition table stored in the SSD, which includes region type of each region, the method comprises:
   receiving, by the SSD, a command from a host to read the partition table; and
   the SSD retrieving, the partition table, removing one or more regions, with the region type being locked, from the partition table, and returning the partially removed partition table; wherein the host instructed the SSD to sets the one or more regions type to locked.

2. The method for protecting partial space of the SSD according to claim 1, wherein the partition table includes partition planning information for each region, and the partition planning information includes region type and start and end addresses, removing one or more regions with the region type being locked from the partition table includes: setting the partition planning information corresponding to the one or more regions with the region type being locked to a default value.

3. The method for protecting partial space of the SSD according to claim 1, wherein if the region type of the one or more regions is unlocked or not-locked, the partition table is directly returned.

4. The method for protecting partial space of the SSD according to claim 3, wherein the not-locked type represents the region is readable, writable, and erasable, and the unlocked type represents the region is readable, writable, and unerasable.

5. The method for protecting partial space of the SSD according to claim 1, wherein the locked type represents the region is unreadable, unwritable, and unerasable.

6. An SSD storage system comprises: storage space of the SSD is divided into multiple regions and a partition table stored in the SSD, which includes region type of each region; when the SSD receives a command from a host to read the partition table, the SSD retrieves the partition table, removes one or more regions with the region type being locked from the partition table, and returns the partially removed partition table; wherein the host instructed the SSD to sets the one or more regions type to locked.

7. The SSD storage system according to claim 6, wherein the partition table includes partition planning information for each region, which includes region type and start and end addresses, removing one or more regions with the region type being locked from the partition table includes: setting the partition planning information corresponding to the one or more regions with the region type being locked to a default value.

8. The SSD storage system according to claim 6, wherein if the region type of the one or more regions is unlocked or not-locked, the partition table is directly returned.

9. The SSD storage system according to claim 6, wherein the SSD storage system has at least four statuses:
   status 0: the storage space of the SSD is not divided into multiple regions;
   status 1: the storage space of the SSD is divided into multiple regions, with each region not-locked;
   status 2: the storage space of the SSD is divided into multiple regions, with at least one region locked but has been unlocked; and
   status 3: the storage space of the SSD is divided into multiple regions, with at least one region locked.

10. The SSD storage system according to claim 9, wherein the not-locked type represents the region is readable, writable, and erasable, the unlocked type represents the region is readable, writable, and unerasable, and the locked type represents the region is unreadable, unwritable, and unerasable.

* * * * *